US008610314B2

(12) United States Patent
Weichert et al.

(10) Patent No.: US 8,610,314 B2
(45) Date of Patent: Dec. 17, 2013

(54) SWITCHING PHASE OFFSET FOR CONTACTOR OPTIMIZATION

(75) Inventors: Hans Weichert, Granichen (CH); James Peter Miller, Waukesha, WI (US); Urs Hunziker, Niedergösgen (CH); Reynald Kaltenrieder, Muhen (CH); Lorenz Laeuppi, Graenichen (CH)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 13/570,535

(22) Filed: Aug. 9, 2012

(65) Prior Publication Data

US 2012/0299395 A1 Nov. 29, 2012

Related U.S. Application Data

(63) Continuation of application No. 12/714,000, filed on Feb. 26, 2010, now Pat. No. 8,310,111.

(60) Provisional application No. 61/157,846, filed on Mar. 5, 2009.

(30) Foreign Application Priority Data

May 29, 2009 (EP) .................................. 090072489

(51) Int. Cl.
*H01H 83/00* (2006.01)
*H02H 3/00* (2006.01)
*H01H 47/00* (2006.01)

(52) U.S. Cl.
USPC .......................................................... 307/130

(58) Field of Classification Search
USPC .................. 307/129, 130, 139, 142; 335/133; 361/2-3, 5-7
See application file for complete search history.

(56) References Cited

U.S. PATENT DOCUMENTS

| | | | |
|---|---|---|---|
| 4,471,183 | A | 9/1984 | Bauer et al. |
| 4,922,363 | A | 5/1990 | Long et al. |
| 5,432,491 | A | 7/1995 | Peter et al. |
| 5,559,426 | A | 9/1996 | Shea et al. |
| 2004/0169976 | A1 | 9/2004 | Zhou et al. |
| 2005/0013085 | A1 | 1/2005 | Kinsella et al. |

FOREIGN PATENT DOCUMENTS

| | | | |
|---|---|---|---|
| BE | 514142 | A | 9/1952 |
| CN | 2415456 | Y | 1/2001 |
| DE | 951020 | C | 10/1956 |
| DE | 4105698 | A1 | 8/1992 |
| DE | 19809828 | C1 | 7/1999 |
| EP | 1453073 | A1 | 9/2004 |

OTHER PUBLICATIONS

Brunke, et al. Elimination of Transformer Inrush Currents by Controlled Switching—Part I—Theoretical Considerations. http://ewh.ieee.org/soc/pes/switchgear/CIGRECSseminar/Txinrushpart1.pdf. Last accessed May 29, 2010, 6 pages.

(Continued)

*Primary Examiner* — Carlos Amaya
(74) *Attorney, Agent, or Firm* — Turocy & Watson, LLP; William R. Walbrun; John M. Miller

(57) ABSTRACT

A system and methods providing for minimizing the arc energy delivered to the pads of a plurality of contactors using a single control coil based on monitoring the electrical sine waves of the three alternating current electrical poles and calculating the instant to energize or deenergize a single control coil. The remainder of the contactors will make or break based on an offset in time from the making or breaking of the control contactor.

20 Claims, 12 Drawing Sheets

(56) References Cited

OTHER PUBLICATIONS

Brunke, et al., Elimination of Transformer Inrush Currents by Controlled Switching—Part II—Application and Performance Considerations. http://ewh.ieee.org/soc/pes/switchgear/CIGRECSseminar/Txinrushpart2.pdf. Last accessed May 29, 2010, 6 pages.
Dick, et al., Point-On-Wave Capacitor Switching and Adjustable Speed Drives. IEEE Transactions on Power Delivery, vol. 11, No. 3, Jul. 1996.
Zhou, et al., Asynchronous modular contactor for intelligent motor control applications. Holm Conference on Electrical Contacts, Chicago, 2005.
Moraw, et al., Point on wave controlled switching of high voltage circuit breakers. Int. Conference on Large High Voltage Electric Systems, Paris, 1988.
Zhihong, et al., Intelligent Control Technology of AC Contactor. Peiming, 2005, IEEE/PES Transmission and Distribution Conference & Exhibition: Asia and Pacific Dalian, China.
Unsworth, Elimination of inrush currents in transformers. University of Sussex, 2003.
Unsworth, Star-Delta Starting with Two-stage Contactor Closure. University of Sussex, 2003.
OA dated Dec. 9, 2011 for U.S. Appl. No. 12/714,000, 24 pages.
Chinese Office Action dated Apr. 20, 2012 for Chinese Patent Application No. 201010127293.1, 21 pages.
European Search Report dated Oct. 24, 2011 for European Patent Application No. 09007248.9-2214 / 2226820, 6 pages.

| NORMAL CONTACTOR | | | |
|---|---|---|---|
| TIME [ms] | ARC - ENERGY [Ws] PHASE R | PHASE S | PHASE T |
| | | | |
| 0 | 0.23 | 4.94 | 5.14 |
| 1 | 0.00 | 3.30 | 3.69 |
| 2 | 5.13 | 1.17 | 6.94 |
| 3 | 4.49 | 0.32 | 5.25 |
| 4 | 3.70 | 0.06 | 4.09 |
| 5 | 6.63 | 5.14 | 1.67 |
| 6 | 4.75 | 4.28 | 0.48 |
| 7 | 3.18 | 3.13 | 0.06 |
| 8 | 1.48 | 6.70 | 0.00 |
| 9 | 0.44 | 4.88 | 4.74 |
| 10 | 0.11 | 3.76 | 3.98 |
| 11 | 6.43 | 1.41 | 7.88 |
| 12 | 5.97 | 0.55 | 6.21 |
| 13 | 5.15 | 0.09 | 4.87 |
| 14 | 4.34 | 0.01 | 3.90 |
| 15 | 8.12 | 7.08 | 1.26 |
| 16 | 6.10 | 5.99 | 0.40 |
| 17 | 4.31 | 4.47 | 0.03 |
| 18 | 1.48 | 8.17 | 6.25 |
| 19 | 0.82 | 6.51 | 5.66 |
| TOTAL: | 72.86 | 71.98 | 72.49 |
| ⌀ PER PHASE | 3.64 | 3.60 | |
| ⌀ | 3.62 Ws | | |

FIG. 10
PRIOR ART

| POW CONTACTOR | | | |
|---|---|---|---|
| TIME [ms] | ARC - ENERGY [Ws] PHASE R | PHASE S | PHASE T |
| | | | |
| 2 | 2.09 | 0.95 | 2.03 |
| 1 | 0.80 | 0.16 | 0.82 |
| 0 | 0.33 | 0.00 | 0.43 |
| -1 | 0.73 | 12.44 | 4.70 |
| -2 | 0.14 | 11.84 | 3.95 |

⌀ - at 2ms: 1.70 Ws
⌀ - at 1ms: 0.60 Ws
⌀ - at 0ms: 0.26 Ws
⌀ - at -1ms: 5.96 Ws
⌀ - at -2ms: 5.32 Ws

FIG. 11

| NORMAL CONTACTOR | | | |
|---|---|---|---|
| TIME [ms] | ARC - ENERGY [Ws] PHASE R | PHASE S | PHASE T |
| 0 | 5.95 | 231.12 | 286.16 |
| 1 | 0.01 | 170.83 | 196.00 |
| 2 | 453.11 | 367.90 | 32.65 |
| 3 | 279.46 | 320.20 | 8.03 |
| 4 | 279.21 | 189.19 | 0.47 |
| 5 | 431.30 | 45.17 | 434.94 |
| 6 | 290.79 | 10.30 | 326.26 |
| 7 | 216.69 | 0.45 | 254.62 |
| 8 | 91.59 | 480.26 | 483.82 |
| 9 | 36.87 | 379.89 | 442.75 |
| 10 | 12.73 | 293.30 | 356.56 |
| 11 | 417.20 | 533.48 | 93.72 |
| 12 | 407.85 | 445.99 | 42.40 |
| 13 | 341.41 | 280.61 | 5.97 |
| 14 | 546.62 | 89.96 | 503.45 |
| 15 | 410.86 | 29.93 | 416.43 |
| 16 | 284.08 | 3.84 | 282.03 |
| 17 | 108.02 | 416.33 | 494.92 |
| 18 | 31.63 | 326.73 | 450.98 |
| 19 | 4.07 | 240.19 | 300.42 |
| TOTAL: | 4649.45 | 4855.67 | 5412.58 |
| ø PER PHASE | 232.47 | 242.78 | 270.63 |
| ø | 248.63 Ws | | |

*FIG.12*
PRIOR ART

| POW CONTACTOR | | | |
|---|---|---|---|
| TIME [ms] | ARC - ENERGY [Ws] PHASE R | PHASE S | PHASE T |
| 2 | 95.73 | 33.98 | 87.25 |
| 1 | 47.21 | 8.85 | 43.61 |
| -0.1 | 480.64 | 937.43 | 428.41 |

ø - at 2ms: 72.32 Ws
ø - at 1ms: 33.22 Ws
ø - at 0.1ms: 615.49 Ws

*FIG.13*

SWITCHING PHASE OFFSET FOR CONTACTOR OPTIMIZATION

CROSS-REFERENCE TO RELATED APPLICATIONS

This application is a continuation of co-pending U.S. patent application Ser. No. 12/714,000, entitled "SWITCHING PHASE OFFSET FOR CONTACTOR OPTMIZATION," and filed Feb. 26, 2010. This application also claims priority from European Application No. 09007248.9, filed on May 29, 2009, and U.S. Provisional Application No. 61/157,846, filed on Mar. 5, 2009. The entireties of each of the foregoing applications are incorporated herein by reference.

BACKGROUND

Contactors are unintelligent devices designed to switch randomly with respect to the alternating current (AC) wave pattern based on the point in time the contactor connects or disconnects the electrical flow. Typically, three poles are mated together into a contactor, one for each phase of the three-phase alternating current. At the point where the electrical coil driving a contactor is deenergized and the contactor is disconnected, each pole of the contactor disconnects effectively simultaneously, but randomly with respect to the three different electrical phases operating one hundred twenty degrees out of synchronization from the other two phases. This behavior is repeated when the electrical coil driving the contactor is energized and the contactor is connected and each pole of the contactor connects effectively simultaneously, but once again randomly with respect to the three different electrical phases.

An improvement to this technology involves smart devices that disconnect when the electrical voltage reaches a minimum value. The method of determining the minimum value varies from monitoring the voltage of the wave forms to determine a minimum average value as in the point on wave (POW) technology or by electronic devices that can only disconnect when the voltage is at a low value. These technologies require complicated systems to make the determination of when the voltage is at a low value and consequently are expensive to implement and difficult to control. Consequently these devices are only suited for large devices on large applications.

Market pressure to provide contactors capable of longer operational life and lower probability of damage to equipment powered through contactors has led to a desire for improved contactor operational design. The market is demanding a better balance between the random operational characteristics of the unintelligent contactor design and the complicated and expensive point on wave technology that currently controls all three phases of the alternating current supply. Additionally, increasing market pressure is directed at providing point on wave type control of contactors to smaller devices because of the benefits realized in the larger devices and applications.

SUMMARY

The following presents a simplified summary in order to provide a basic understanding of some aspects of the disclosed innovation. This summary is not an extensive overview, and it is not intended to identify key or critical elements or to delineate the scope of the invention. Its sole purpose is to present some concepts in a simplified form as a prelude to the more detailed description presented later.

The present innovation blends the existing unintelligent contactor technology with the point on wave technology to create a new technology that provides the benefits of the point on wave technology without the complexity and expense of implementing the current point on wave technology. The innovation exploits research by applicants that a significant reduction in arc energy is accomplished by opening or closing the contacts at specific points on the sine wave of a phase in conjunction with the realization that if one of the contacts makes last or breaks first then only this particular contact requires point on wave control to benefit from the point on wave technology.

Applicants' innovation therefore combines the control aspect of point on wave technology with a new mechanical design to provide a contactor that monitors the wave characteristics of the electrical feed to determine when to make or break a contactor but includes the unintelligent mechanical switching of two of the poles offset from the third pole to reduce the cost and complexity of the point on wave technology. Accordingly, this innovation provides a new technology to smaller devices and applications that desire to provide the benefits of longer contactor life and lower probability of damage to equipment powered through an intelligent contactor system.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 10 is a table showing the arc energy of a conventional contactor.

FIG. 11 is a table summarizing the arc energy of a POW contactor.

FIG. 12 is another table showing the arc energy of a conventional contactor.

FIG. 13 is a table showing the arc energy for breaking a POW contactor.

DETAILED DESCRIPTION

Figure 1:
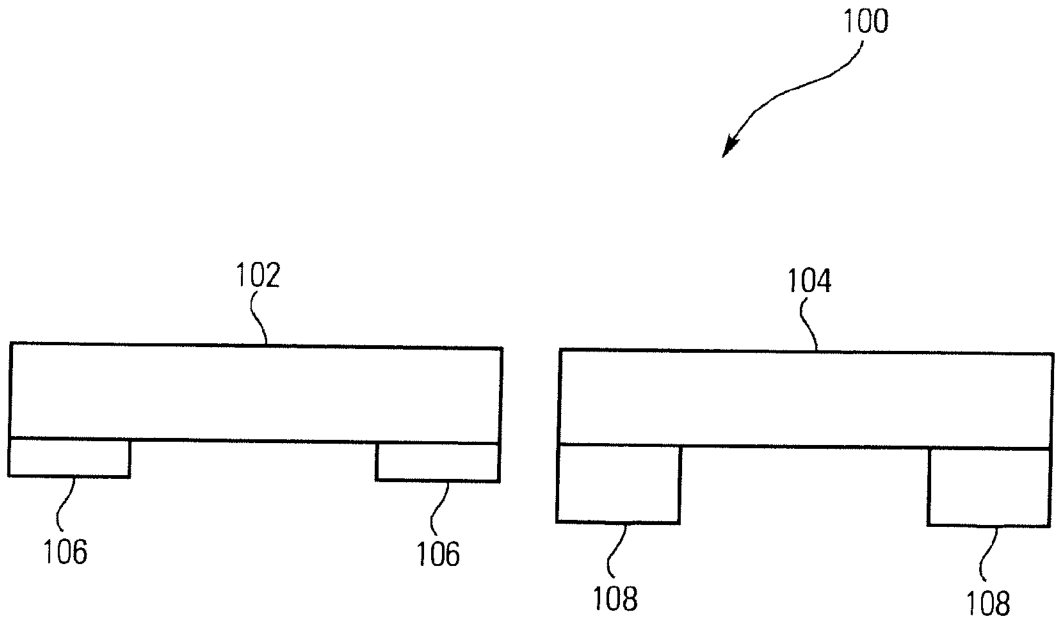
FIG. 1 depicts a block diagram of the moveable contacts illustrating the different thicknesses of contact material.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms “component,” “system,” “equipment,” “interface”, “network,” and/or the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer, an industrial controller, a relay, a sensor and/or a variable frequency drive. By way of illustration, both an application running on a server and the server can be a component. One or more components can reside within a process and/or thread of execution, and a component can be localized on one computer and/or distributed between two or more computers.

In addition to the foregoing, it should be appreciated that the claimed subject matter can be implemented as a method, apparatus, or article of manufacture using typical programming and/or engineering techniques to produce software, firmware, hardware, or any suitable combination thereof to control a computing device, such as a variable frequency drive and controller, to implement the disclosed subject matter. The term “article of manufacture” as used herein is intended to encompass a computer program accessible from any suitable computer-readable device, media, or a carrier generated by such media/device. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave generated by a transmitter can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word “exemplary” is used herein to mean serving as an example, instance, or illustration. Any aspect or design described herein as “exemplary” is not necessarily to be construed as preferred or advantageous over other aspects or designs. Rather, use of the word exemplary is intended to present concepts in a concrete fashion. As used in this application, the term “or” is intended to mean an inclusive “or” rather than an exclusive “or”. That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form.

Furthermore, the terms to “infer” or “inference”, as used herein, refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring to the drawings, FIG. 1 depicts a block diagram of the two different contact designs comprising the three moveable contacts of the system. Contact 104 represents two of the three contacts (depicted in FIG. 2). The two contacts 104 (depicted in FIG. 2) will always make first and break last. This design is accomplished by adding additional material to the contact pads 108 as illustrated in contactor design 100. Contact 102 represents the contact that makes last and breaks first. This moveable contact has contact pads 106 that have less material and therefore have a longer travel path to reach the corresponding stationary contact pads 110.

In another aspect of this innovation, the contact pads 106 and 108 can be manufactured to the same thickness and the contact pad mounting blocks 202 can be manufactured with similar differences in length to accomplish the same dimensional differences between the moving contact pads 106, 108 and the stationary contact pads 110. As will be discussed later, these dimensional differences provide for the offset in make and break times between the two contacts designed to make first and break last and the one contact designed to make last and break first.

Figure 2:
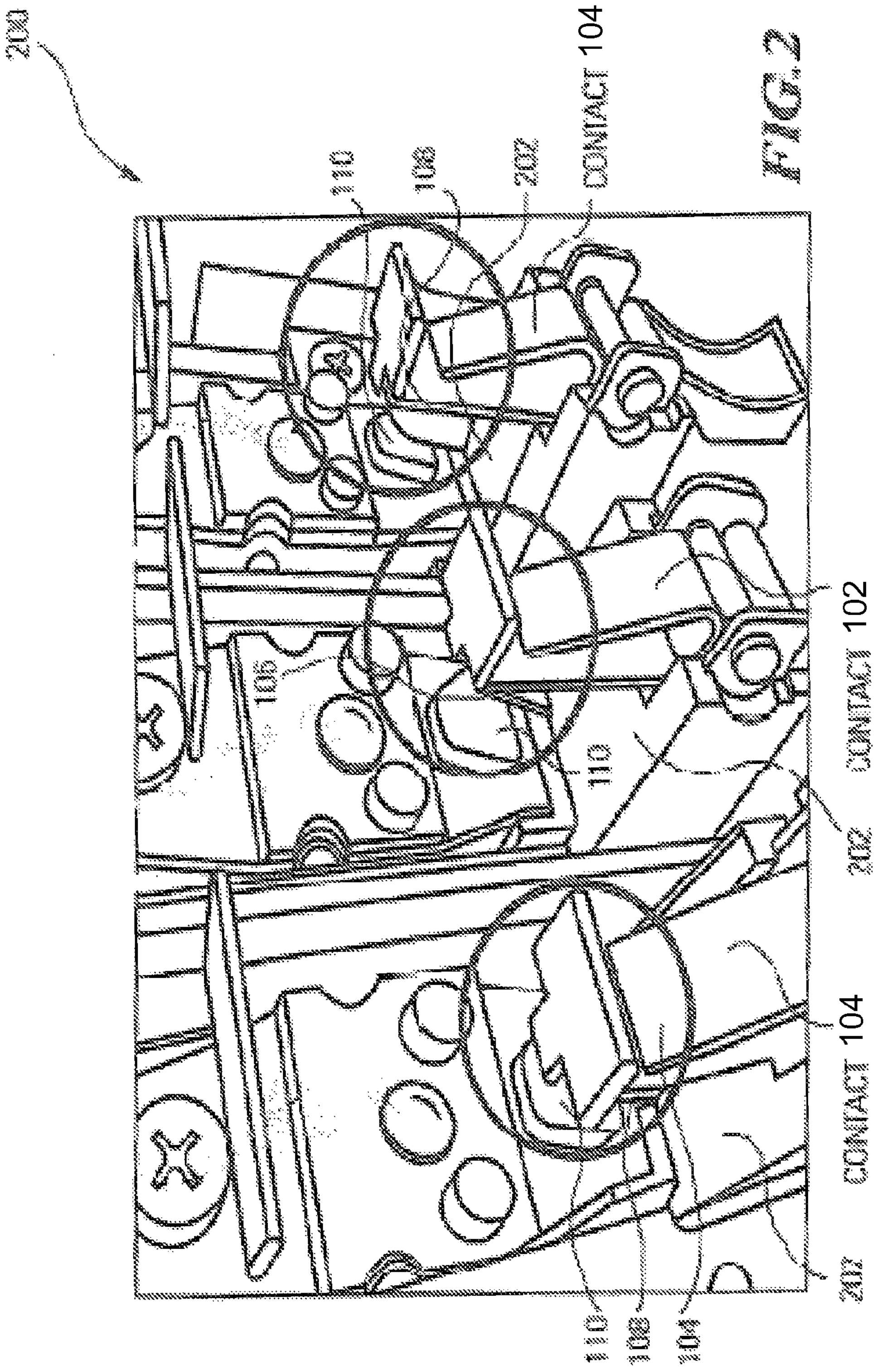
FIG. 2 depicts a diagram of the three pole contactors connected together by the common crossbar.

Referring again to the drawings, FIG. 2 depicts in 200 the three pole moveable contacts 102, 104 attached to the moveable mounting blocks 202. As described previously, one implementation relies on contact pads 106, 108 of different thickness while another implementation relies on mounting blocks 202 of different lengths. Either implementation provides for an offset in time between the making of contacts 104 and the subsequent making of contact 102 or the breaking of contact 102 and the subsequent breaking of contacts 104. In another aspect of the subject innovation, mounting blocks 202 are connected together by a common crossbar (not visible) that forces the mounting blocks to move together as a single unit. The common crossbar is connected to a single coil (not visible) that operates to move the three mounting blocks 202 as a single unit either to make or break the contacts 102, 104.

Figure 3:
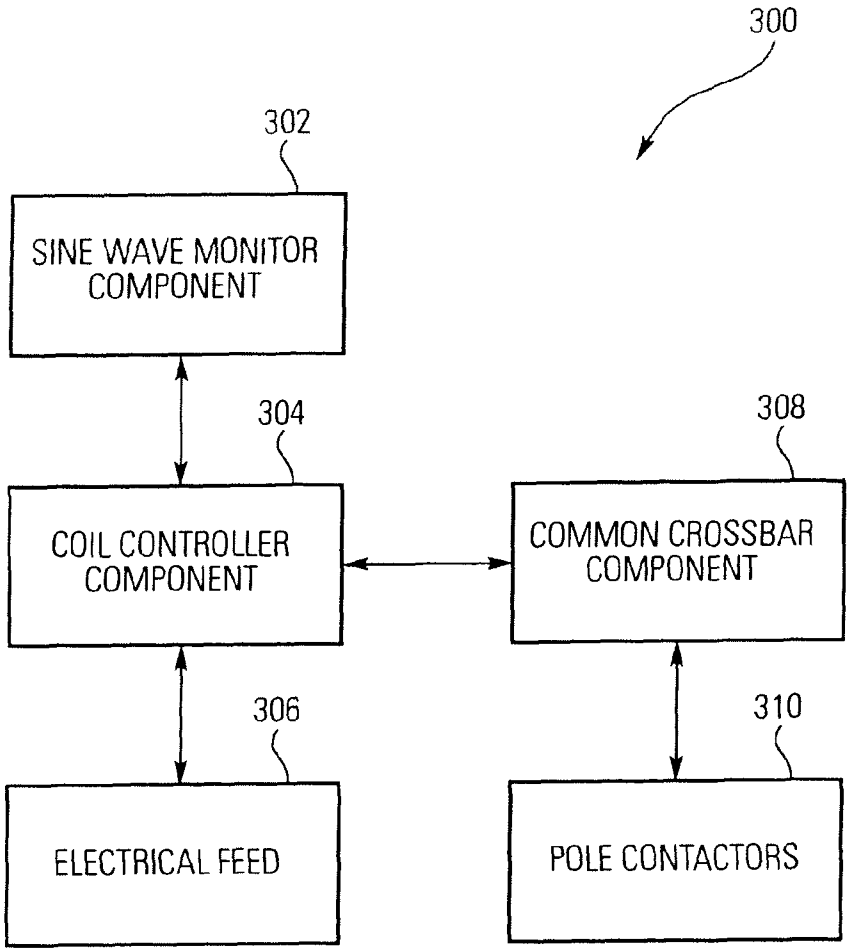
FIG. 3 depicts a block diagram of the coil controller, sine wave monitor and the associated mechanical components.

Referring now to FIG. 3, a coil control system 300 includes a sine wave monitor component 302, a coil controller component 304, an electrical feed 306, a common crossbar component 308 and pole contactors 310. The sine wave monitor component 302 monitors each of the three phases of the electrical feed 306 with respect to the position on the wave of each phase. The information concerning the position on the wave of each phase is transmitted to the communicatively connected single coil controller component 304.

The single coil controller component 304 determines the time to make or break the single contact 102 by energizing or deenergizing the single coil controller. The offset design of the common crossbar component 308 guarantees that the contacts 104 are made first followed by contact 102 at the designed offset time or that contact 102 breaks first followed by contacts 104 at the designed offset time. In another aspect of the subject innovation, the determination of when to initiate the making or breaking of the contacts 102, 104 by the single coil controller is based on the voltage of the load, the current supplied to the load and the type of load. For example, the make and break time of the controlled contact 102 and the offset of the following contacts 104 are different for a motor application than they are for a capacitor application. The goal of the coil control system is to minimize the arc energy delivered to the contacts 102, 104.

In another aspect, the coil control component can measure the arc energy delivered to the contacts 102 and 104 and determine the optimal time to make or break the controlled contact 102 and the offset to delay for the following contacts 104. In this implementation the common crossbar component 308 can provide a variable delay in activating or deactivating the following contacts 104. Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

It should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, media, or a carrier in conjunction with such computer-readable device or media.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, industrial controllers and the like, each of which can be operatively coupled to one or more associated devices. The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Suitable combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

Figure 4:
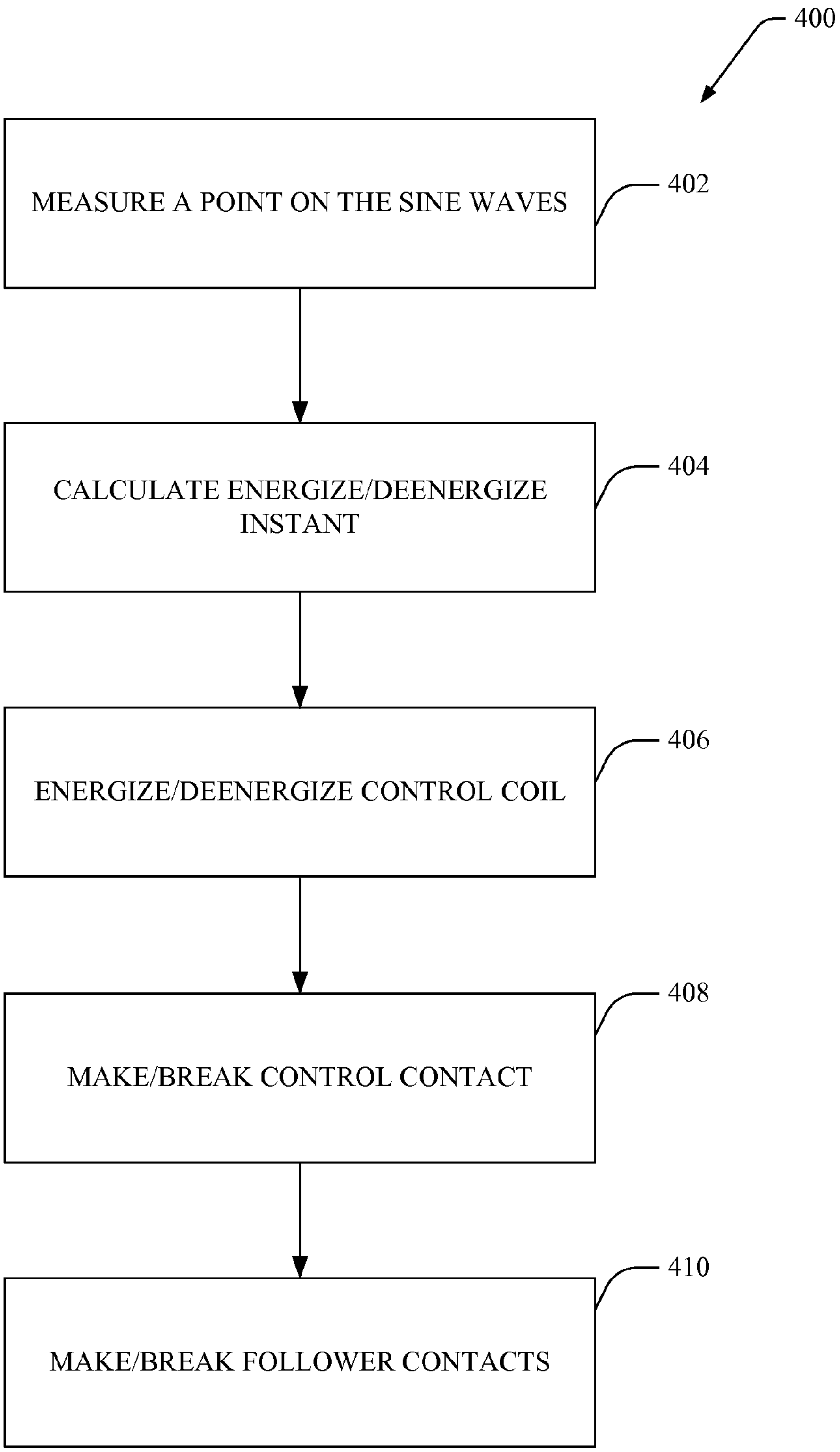
FIG. 4 depicts a method for minimizing the arc energy delivered to contactors.

Referring to FIG. 4, a method of minimizing the arc energy delivered to the contactors for a device is depicted. The first step of the method is measuring the point on the sine wave for each of the three poles at 402. The next step at 404 involves using the point on the sine wave measurements to calculate an instant when the voltage on the three poles is at an optimal value to drive the arc energy delivered to the control contact 104 to a minimum value. Next at step 406, the coil control system energizes or deenergizes the control coil at the calculated instant of minimal arc energy. The next step at 408 is the control contact 102 driven by the control coil makes or breaks based on the action of the control coil on the common crossbar 308. Finally at step 410, the follower contacts 104 make or break after the offset time for the system. It should be noted that the offset time is mechanically set based on the design of the contact pads 106, 108, the contact carrier parts, or the moveable contact mounting blocks 202.

Figure 5:
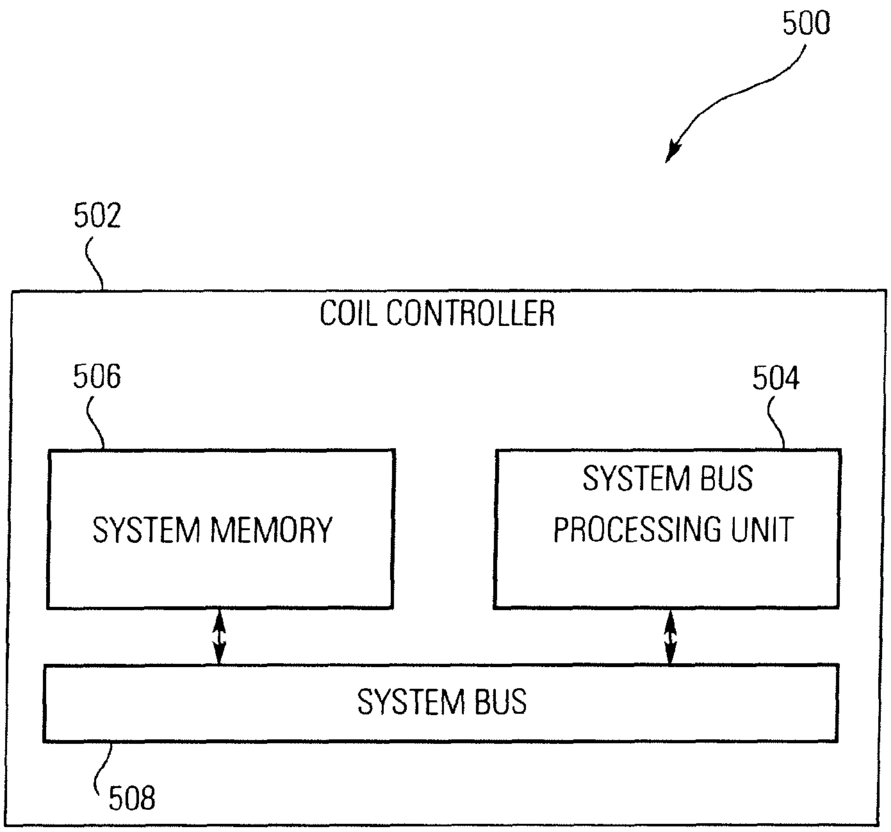
FIG. 5 depicts a schematic block diagram illustrating a suitable operating environment for the coil controller.

With reference to FIG. 5, the exemplary environment 500 for implementing various aspects includes a coil controller 502, the coil controller 502 including a processing unit 504, a system memory 506 and a system bus 508. The system bus 508 couples system components including, but not limited to, the system memory 506 to the processing unit 504. The processing unit 504 can be any of various commercially available processors, such a single core processor, a multi-core processor, or any other suitable arrangement of processors. The system bus 508 can be any of several types of bus structure that can further interconnect to a memory bus (with or without a memory controller), a peripheral bus, and a local bus using any of a variety of commercially available bus architectures. The system memory 506 can include read-only memory (ROM), random access memory (RAM), high-speed RAM (such as static RAM), EPROM, EEPROM, and/or the like. Additionally or alternatively, the coil controller 502 can include a hard disk drive, upon which program instructions, data, and the like can be retained. Moreover, removable data storage can be associated with the coil controller 502. Hard disk drives, removable media, etc. can be communicatively coupled to the processing unit 504 by way of the system bus 508. The system memory 506 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the coil controller 502 through one or more wired/wireless input devices, such as a keyboard, pointing and clicking mechanism, pressure sensitive screen, microphone, joystick, stylus pen, etc. A monitor or other type of interface can also be connected to the system bus 508. The coil controller 502 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The coil controller 502 can connect to other devices/networks by way of antenna, port, network interface adaptor, wireless access point, modem, and/or the like.

The coil controller 502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and BluetoothTM wireless technologies. Thus, the communication can be a predefined structure as with a conventional network or simply an ad hoc communication between at least two devices.

Figure 6:
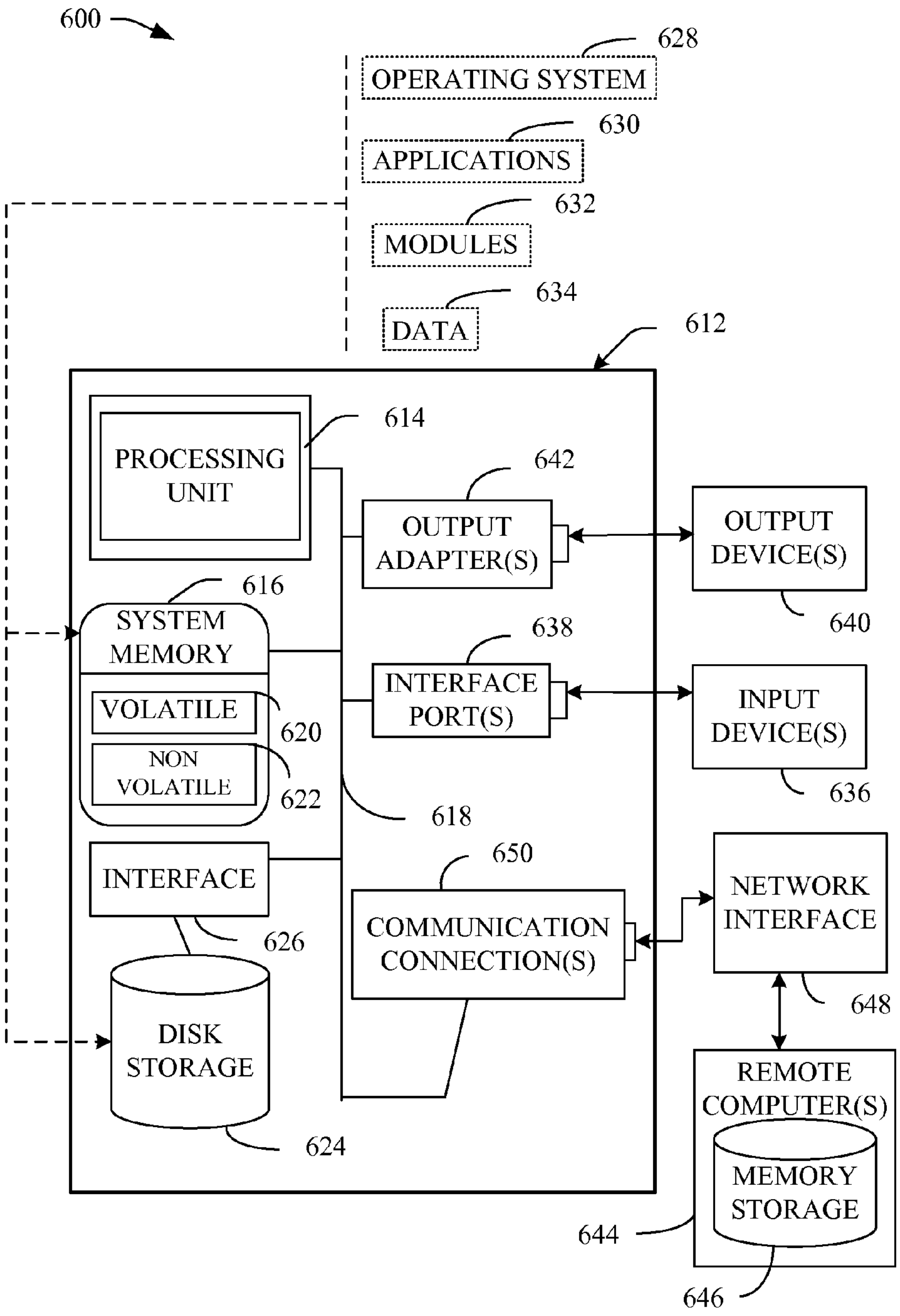
FIG. 6 depicts a schematic block diagram of a sample-computing environment.

In order to provide a context for the various aspects of the disclosed subject matter, FIG. 6 as well as the following discussion is intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 6, an exemplary environment 600 for implementing various aspects disclosed herein includes a computer 612 (e.g., desktop, laptop, server, hand held, programmable consumer or industrial electronics . . . ). Additionally, computer 612 can comprise an actual target hardware system, and can comprise an embedded computer that has all the characteristics of environment 600. The computer 612 includes a processing unit 614, a system memory 616, and a system bus 618. The system bus 618 couples system components including, but not limited to, the system memory 616 to the processing unit 614. The processing unit 614 can be any of various available microprocessors. Dual microprocessors and other multiprocessor architectures also can be employed as the processing unit 614. The system bus 618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI). The system memory 616 includes volatile memory 620 and nonvolatile memory 622. The basic input/output system (BIOS), containing the basic routines to transfer information between elements within the computer 612, such as during start-up, is stored in nonvolatile memory 622. By way of illustration, and not limitation, nonvolatile memory 622 can include read only memory (ROM), programmable ROM (PROM), electrically programmable ROM (EPROM), electrically erasable ROM (EEPROM), or flash memory. Volatile memory 620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 612 also includes removable/non-removable, volatile/nonvolatile computer storage media. FIG. 6 illustrates, for example, disk storage 624. Disk storage 624 includes, but is not limited to, devices like a magnetic disk drive, floppy disk drive, tape drive, Jaz drive, Zip drive, LS-100 drive, flash memory card, or memory stick. In addition, disk storage 624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to the system bus 618, a removable or non-removable interface is typically used such as interface 626.

It is to be appreciated that FIG. 6 describes software that acts as an intermediary between users and the basic computer resources described in suitable operating environment 600. Such software includes an operating system 628. Operating system 628, which can be stored on disk storage 624, acts to control and allocate resources of the computer system 612. System applications 630 take advantage of the management of resources by operating system 628 through program modules 632 and program data 634 stored either in system memory 616 or on disk storage 624. It is to be appreciated that the present invention can be implemented with various operating systems or combinations of operating systems.

A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638. Interface port(s) 638 include, for example, a serial port, a parallel port, a game port, and a universal serial bus (USB). Output device(s) 640 use some of the same type of ports as input device(s) 636. Thus, for example, a USB port may be used to provide input to computer 612 and to output information from computer 612 to an output device 640. Output adapter 642 is provided to illustrate that there are some output devices 640 like displays (e.g., flat panel and CRT), speakers, and printers, among other output devices 640 that require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a personal computer, a server, a router, a network PC, a workstation, a microprocessor based appliance, a peer device or other common network node and the like, and typically includes many or all of the elements described relative to computer 612. For purposes of brevity, only a memory storage device 646 is illustrated with remote computer(s) 644. Remote computer(s) 644 is logically connected to computer 612 through a network interface 648 and then physically connected via communication connection 650. Network interface 648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 650 refers to the hardware/software employed to connect the network interface 648 to the bus 618. While communication connection 650 is shown for illustrative clarity inside computer 612, it can also be external to computer 612. The hardware/software necessary for connection to the network interface 648 includes, for exemplary purposes only, internal and external technologies such as, modems including regular telephone grade modems, cable modems, power modems and DSL modems, ISDN adapters, and Ethernet cards or components.

Figure 7:
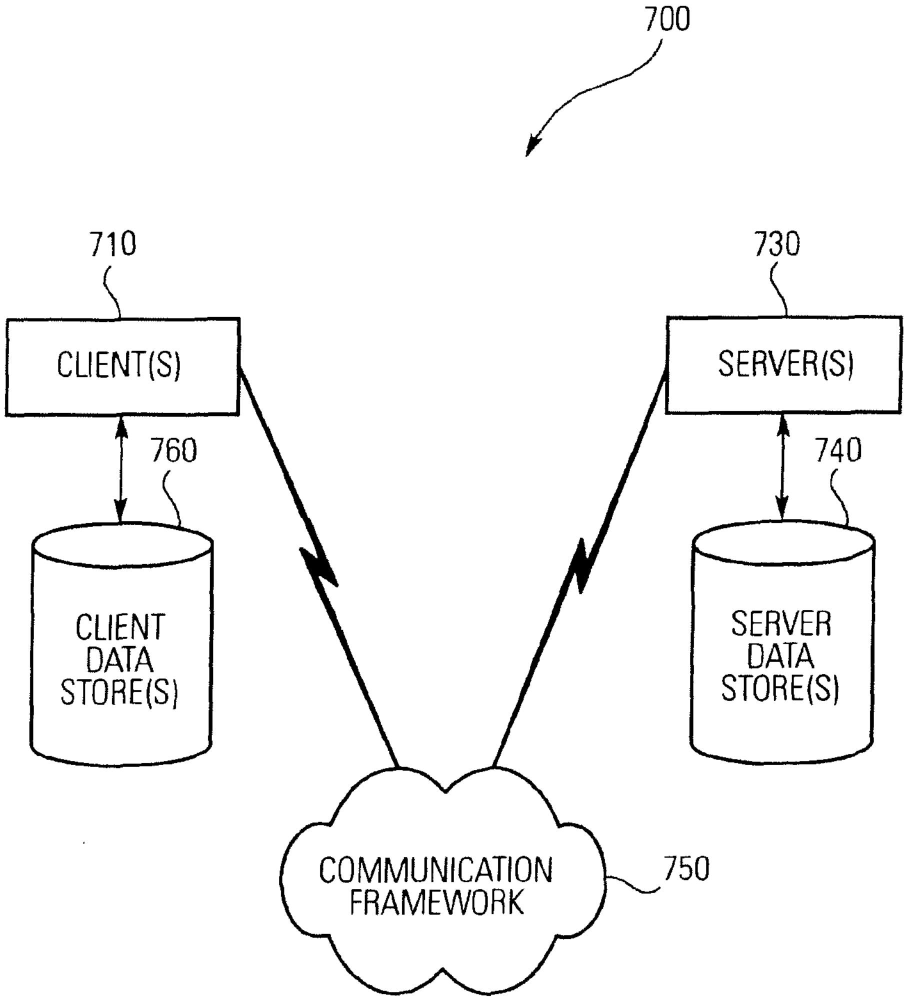
FIG. 7 depicts a schematic block diagram of a sample-computing network environment.

FIG. 7 is a schematic block diagram of a sample-computing environment 700 with which the present invention can interact. The system 700 includes one or more client(s) 710. The client(s) 710 can be hardware and/or software (e.g., threads, processes, computing devices). The system 700 also includes one or more server(s) 730. Thus, system 700 can correspond to a two-tier client server model or a multi-tier model (e.g., client, middle tier server, data server), amongst other models. The server(s) 730 can also be hardware and/or software (e.g., threads, processes, computing devices). The servers 730 can house threads to perform transformations by employing the present invention, for example. One possible communication between a client 710 and a server 730 may be in the form of a data packet adapted to be transmitted between two or more computer processes.

The system 700 includes a communication framework 750 that can be employed to facilitate communications between the client(s) 710 and the server(s) 730. The client(s) 710 are operatively connected to one or more client data store(s) 760 that can be employed to store information local to the client(s) 710. Similarly, the server(s) 730 are operatively connected to one or more server data store(s) 740 that can be employed to store information local to the servers 730.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In view of the exemplary systems described supra, methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or similar result. Moreover, not all illustrated blocks are required to implement the methodologies described hereinafter. In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

Figure 9:
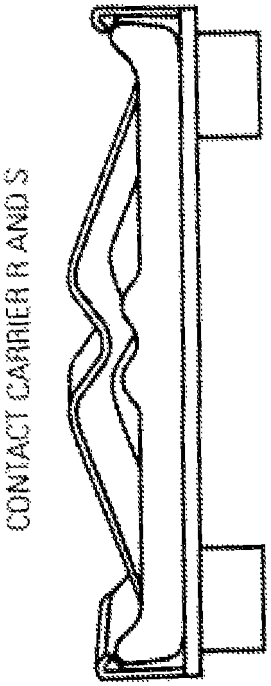
FIGS. 8 and 9 depict a comparison between a conventional contact carrier and a modified contact carrier.
Figure 8:
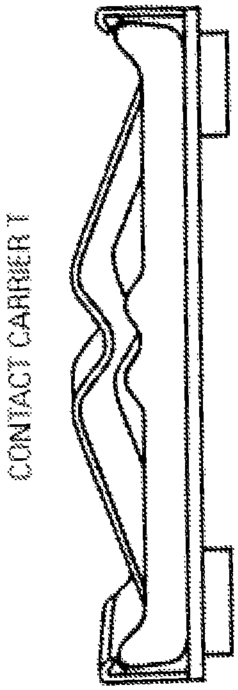
PRIOR ART FIG.8

FIGS. 8 and 9 show a comparison between a conventional contact carrier T (on the left-hand side) and modified contact carriers R and S (on the right-hand side). As can be seen from the figures, there is material added to the movable contact on the right and by adding the contact material the outside contacts are modified to make first and break last.

As already mentioned, the three phases are monitored to determine phase angles. Instead of having three individual coils controlling the individual poles, only one coil is provided which releases a common crossbar at an optimized time in order to reduce the arc energy. It could be shown that it is advantageous to control the point of time at which the device switches in order to minimize the arch energy.

FIG. 10 shows in the form of a table the arc energy for the three phases at different instances for a conventional contactor. In comparison thereto FIG. 11 shows the arc energy for a POW contactor. As can be seen from FIGS. 10 and 11, the arc energy is at a minimum for zero milliseconds on a 400 VAC 30 amps inductive load, but increases quickly after crossover.

FIGS. 12 and 13 show the arc energy for a conventional contactor and a POW contactor for 100-D180 breaking 400 VAC 50 Hz at 1080 amps inductive. The average for a normal contactor (see FIG. 12) is 248.63 Watt seconds and for a POW controlled contactor with 5 ms offset at 1 ms before zero crossover, it is only 33.22 Ws.

Figure 14:
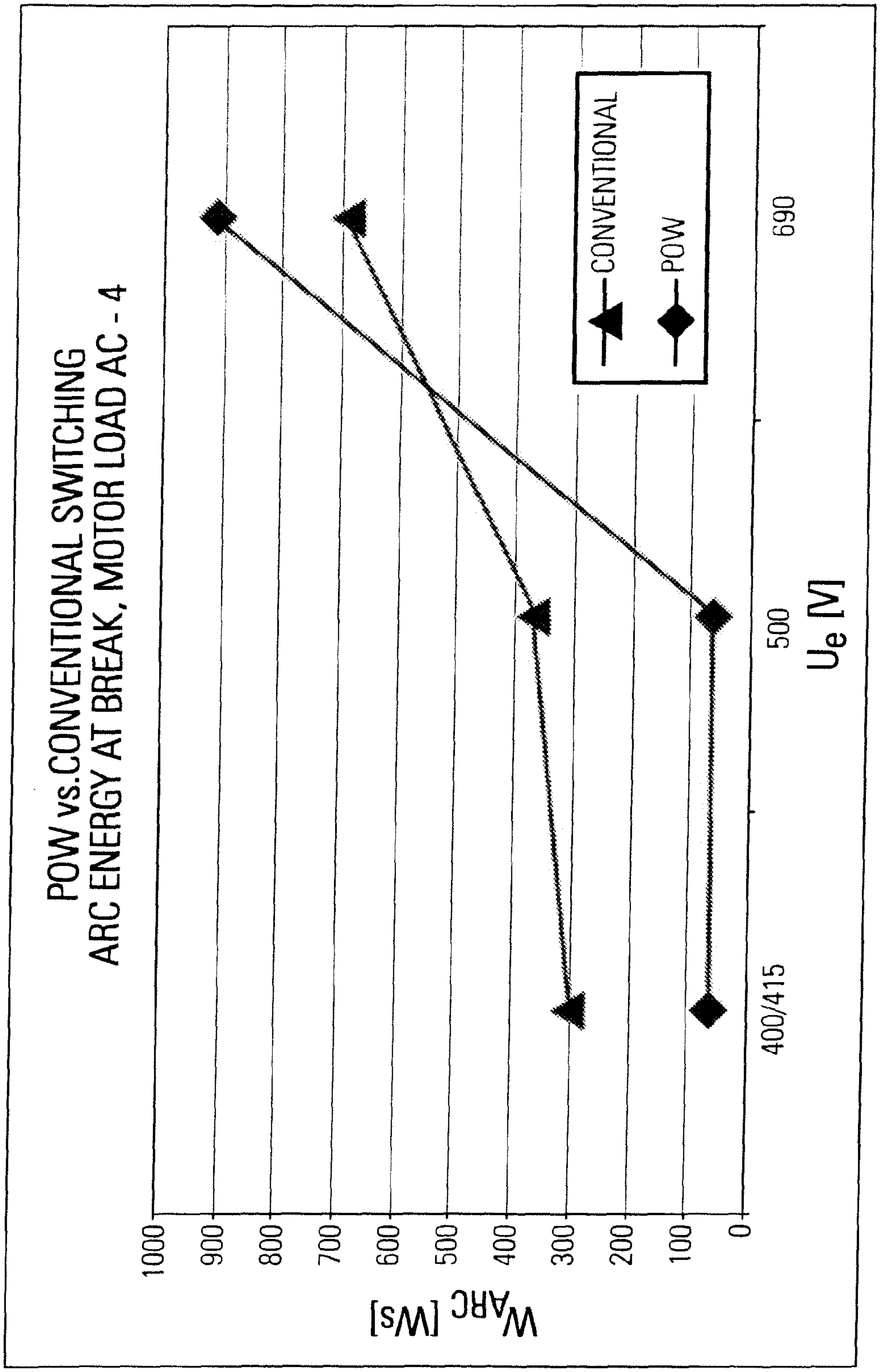
FIG. 14 depicts the arc energy depending on the voltage for POW versus conventional switching.

FIG. 14 compares the arc energy of the conventional contactor and the POW controlled contactor for different input voltages Ue.

Figure 15:
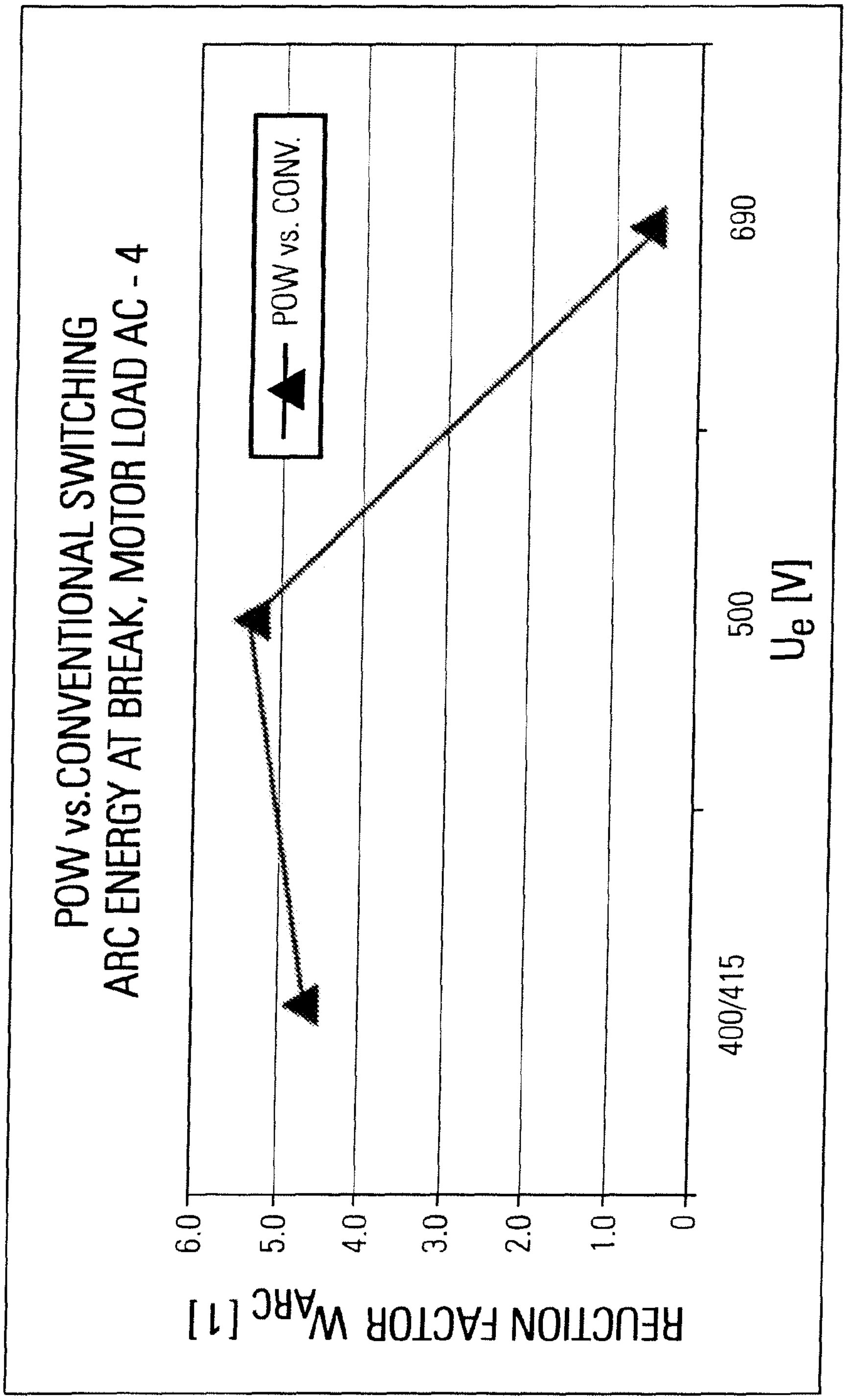
FIG. 15 shows the reduction factor of the arc energy for a comparison of POW versus conventional switching.

In FIG. 15, finally, the reduction factor of the arc energy of a POW contactor versus conventional switching is shown for different input voltages. The reduction at 690 VAC is believed to be caused by a reduction in contact gap on two of the three contacts.

What is claimed is:

1. A system that reduces arc energy delivered to a device, comprising:

a controlled contact attached to a first movable mounting block, a follower contact attached to a second movable mounting block, wherein the controlled contact and the follower contact are coupled to a common cross bar; and a control coil that facilitates a switching of the controlled contact at a first time in response to a detection of a defined data point on an alternating current wave represented by alternating current wave information, and facilitates a mechanical switching of the follower contact at a second time that is offset in time from the first time in response to a detection of motion of the common cross bar.

2. The system of claim 1, further comprising a second follower contact attached to a third moveable mounting block that is coupled to the common crossbar.

3. The system of claim 1, wherein the defined data point corresponds to a minimization of an arc energy delivered to the controlled contact and the follower contact.

4. The system of claim 3, wherein the minimization of the arc energy delivered to the controlled contact and the follower contact facilitates another minimization of the arc energy delivered to the device.

5. The system of claim 1, wherein the common crossbar forces the first movable mounting block and the second movable mounting block to move together as a single unit.

6. The system of claim 1, further comprising a monitor that detects the defined data point on the alternating current wave.

7. A method for decreasing arc energy delivered to a device, comprising:

determining a first time to switch an electrical connectivity of a controlled contact based on detection of a data point on a sine wave corresponding to a minimal value of an arc energy delivered to the controlled contact and a follower contact, wherein the controlled contact and the follower contact are coupled to a crossbar;

switching the electrical connectivity of the controlled contact at the first time;

in response to the switching, moving the crossbar; and in response the moving the crossbar, switching an electrical connectivity of the follower contact at a second time different from the first time by an offset time determined based on the detection of the data point on the sine wave corresponding to the minimal value of arc energy delivered to the controlled contact.

8. The method of claim 7, wherein the data point on the sine wave further corresponds to another minimal value of arc energy delivered to the device equipment.

9. The method of claim 8, further comprising monitoring at least two phases of the sine wave to detect the data point.

10. The method of claim 8, further comprising, in response to the detecting, energizing a control coil to facilitate the moving.

11. The method of claim 7, wherein the switching the electrical connectivity of the control contact further comprises facilitating a movement of a first moveable contact area in response to the detection of the defined point on the sine wave.

12. The method of claim 11, wherein the switching the electrical connectivity of the follower contact further comprises facilitating a movement of a second moveable contact area in response to the moving the crossbar.

13. An apparatus that reduces arc energy delivered to a device, comprising:

a first electrical contact attached to a first movable mounting block and a second electrical contact attached to a second movable mounting block mechanically coupled by a crossbar, wherein the first electrical contact and the second electrical contact are of at least one of different lengths or different thicknesses; and a control component that facilitates a making or a breaking of the first electrical contact at a first time in response to detection of a point on an alternating current wave, wherein the second electrical contact is made or broken at a second time after an offset time from the first time in response to a motion of the crossbar resulting from the making or the breaking of the first electrical contact, and wherein the offset time is defined based on a mechanical design of the second electrical contact.

14. The apparatus of claim 13, further comprising a third electrical contact mechanically coupled to the first electrical contact and the second electrical contact by the crossbar.

15. The apparatus of claim 14, wherein the third electrical contact is made or broken in response to the motion of the crossbar.

16. The apparatus of claim 15, wherein the third electrical contact is made or broken at the first time plus the first offset time and a second offset time, wherein the second offset time is based on a mechanical design of the third electrical contact.

17. The apparatus of claim 13, wherein the first electrical contact and the second electrical contact are a first electrical pole and a second electrical pole, respectively.

18. The apparatus of claim 13, further comprising a monitor that monitors the alternating current wave and detects the point on the alternating current wave.

19. The apparatus of claim 13, wherein the alternating current wave is associated with a set of phases of an electric feed.

20. The apparatus of claim 13, wherein the alternating current wave is a sinusoidal wave.

* * * * *